Patented Apr. 18, 1939

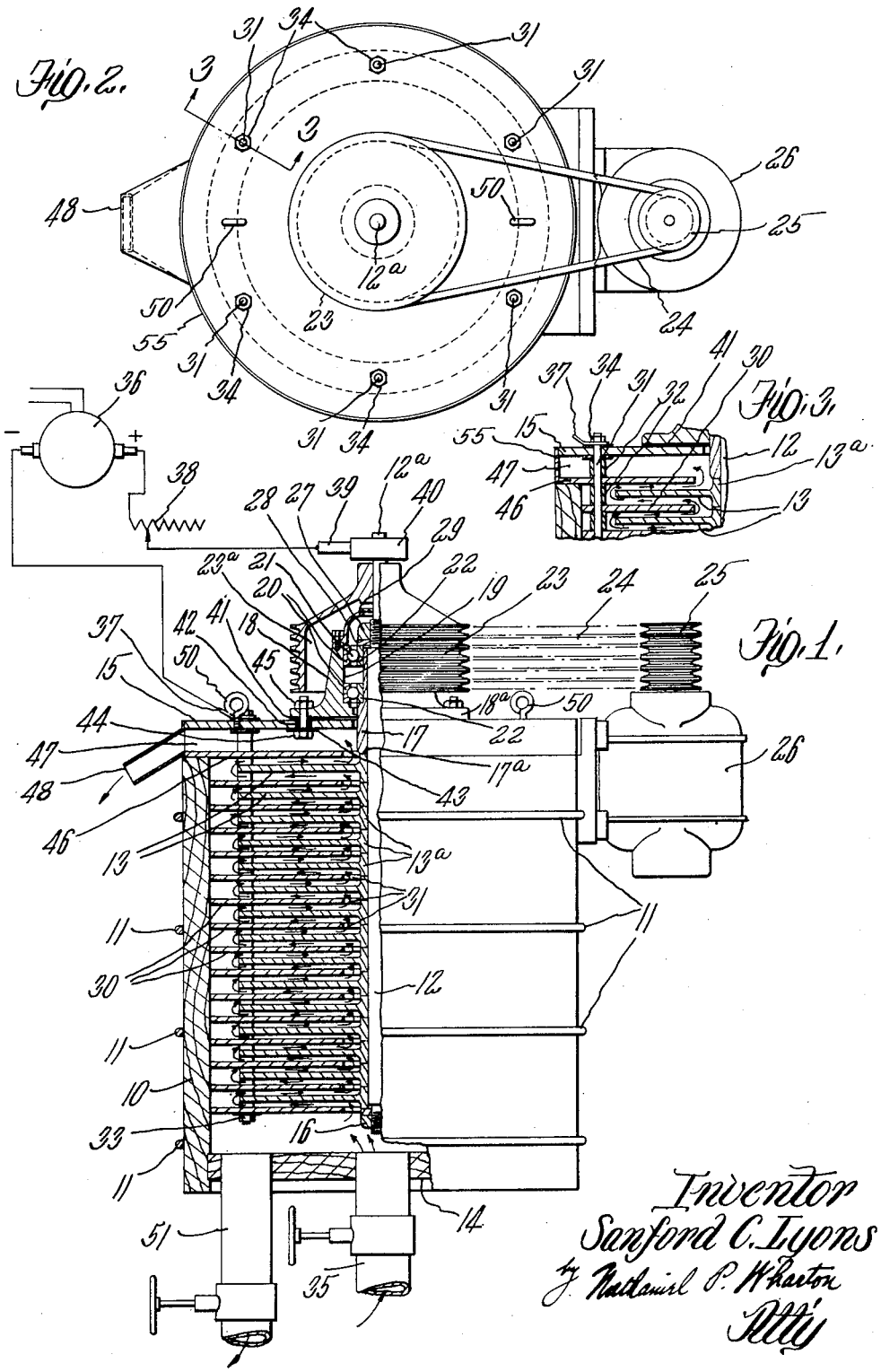

2,154,948

UNITED STATES PATENT OFFICE 2,154,948

METHOD AND APPARATUS FOR BLUNGING AND DECOLORIZING CLAY OR THE LIKE

Sanford C. Lyons, Bennington, Vt., assignor to Bird Machine Co., Walpole, Mass., a corporation of Massachusetts Application May 8, 1937, Serial No. 141,496

12 Claims. (Cl. 204—1)

This invention relates to a method of and apparatus for blunging and decolorizing clay with a view toward making possible the realization from crude clay of finished or refined clay products largely or substantially completely free from the colored and the oversized or gritty impurities generally occurring in the crude clay.

Crude or freshly quarried clay usually contains colored impurities of the nature of ferric oxide and coarse or gritty impurities of the nature of sand and mica. In preparing clay for various uses, e. g., for use in paper-coating compositions, wherein it is desirable that the clay be free from colored and coarse impurities, it is the practice to blunge the crude clay in water and to remove as selectively as possible from the resulting aqueous suspension the coarse impurities, as by settling or centrifuging, and to treat the suspension with chemicals capable of reducing the ferric oxide or similar colored impurities to substantially colorless, water-soluble ferrous salts or the like lending themselves to removal by washing and/or along with the aqueous suspending medium when the clay content is recovered from suspension by filtration, centrifugation, or equivalent treatment.

The method hereof is centered about the performance of combined blunging and decolorizing treatments upon preliminary coarsely suspended or blunged crude clay and is designed to promote disintegration of coarse clay particles or aggregates into finer or colloidal clay particles and the simultaneous exposure of the surfaces presented by such finer or colloidal clay particles to the action of nascent hydrogen, hyposulphurous acid, hyposulphite, or other reducing agent capable of reducing ferric oxide or the like to water-soluble, substantially colorless salt. More particularly, the method hereof involves causing the crude clay suspension to flow as a progressively moving stream between one or more pairs of relatively moving electrode surfaces, at least one electrode of a pair being a cathode and its surface clearing by a small gap the surface of the other relatively moving electrode, in the presence of electrolyte capable of developing nascent hydrogen, hyposulphurous acid, hyposulphite, or analogous reducing agent at or near the cathode, which nascent reducing agent functions to reduce the ferric oxide or similar coloring impurities to water-soluble, substantially colorless salt as the suspended clay particles are undergoing the hydraulic shearing action of the relatively moving electrode surfaces and clay aggregates are being broken up into finer or colloidal particles whose surfaces carrying the coloring impurities are thus also exposed to the nascent reducing agent.

While various electrolytes, such as salts and acids, may be used in the aqueous suspending medium for developing nascent hydrogen as a reducing or decolorizing agent at or near the cathode, it is preferable to employ sulphurous acid and/or its salts as the electrolytes for the reason that the sulphurous acid or sulphite radical is transformed to nascent hyposulphurous acid as well as nascent hydrogen at the cathode and hyposulphurous acid is especially effective in reducing and dissolving colored impurities associated with crude clay, including ferric oxide, which it reduces and dissolves to form colorless ferrous salt. It is thus seen that as nascent hyposulphurous acid and/or nascent hydrogen are being developed over cathode surface while it is moving relatively to the surface of another electrode, (i. e., either cathode or anode surface), the superficial colored impurities on the clay particles are exposed to these nascent reducing or decolorizing agents and are dissolved rapidly to form colorless salt. By virtue of the hydraulic shearing forces which the aggregates or coarse clay particles undergo as they pass through the clearance between the relatively moving electrode surfaces, such aggregates are resolved into the ultimate or much finer clay particles and the reduction and dissolution of the ferric oxide, which is ordinarily the principal colored impurity associated with crude clay, or similar colored impurities is expedited since, as soon as the new or fresh films of colored impurities on the surfaces of the clay particles are exposed to cathode action by sub-division or shearing of the aggregates or coarser particles, they are immediately reduced and dissolved from the particles as colorless salts.

The apparatus for performing the method hereof may assume various forms, including that disclosed in my application Serial No. 156,138, filed July 28, 1937. The form of apparatus of that application is provided with a series of relatively rotatable coaxial cathode discs clearing each other by a small gap and surrounded by a permeable diaphragm outside of which is the anode, the suspension to be treated being caused to flow through a zigzag passage in the cathode compartment defined by the series of cathode discs and undergoing electrolysis and hydraulic shear by relative rotation of the cathode discs as the suspension flows through the zigzag passage from one end disc of the series to the other. The form of apparatus presently to be described in detail herein is generically similar to that of my application Serial No. 156,138, excepting that, in lieu of defining the zigzag path of flow of the suspension by relatively rotatable cathode discs, such path of flow is defined by relatively rotatable, coaxial cathode and anode discs alternating with one another. Thus, the apparatus hereof may comprise essentially an electrolytic cell in whose tank or container there is provided a shaft carrying fixed thereto in spaced relationship a series of rotary plates constituting electrodes and there is also provided a series of stationary plates also constituting electrodes and projecting from the internal tank wall into the spaces between the rotary plates so as to define a zigzag passage from one end of both series of plates to the other, wherefore, the suspension to be treated may be streamed progressively through the zigzag passage as the discs are undergoing relative rotation so as to exert the desired hydraulic shear on the suspended particles and one series of discs may be impressed with a positive electric charge and the other with a negative electric charge so as to induce the desired electrolytic reduction at the cathode plates of iron oxide and similar colored impurities present in the suspension to colorless, water-soluble salts.

With the foregoing and other features and objects in view, the instant invention will now be described in further detail with particular reference to the accompanying drawing, wherein,—

Figure 1 is a composite front elevational and vertical sectional view of an apparatus embodying the invention hereof.

Figure 2 is a plan view of the apparatus.

Figure 3 is a fragmentary detail section on the line 3—3 of Figure 2.

The apparatus shown in Figure 1 includes a cylindrical tank 10, for instance, a wooden tank whose walls are reinforced externally by a number of spaced rings 11. Extending substantially axially within the tank is a shaft 12 to which is fixed a plurality of discs or plates 13 of a metal, preferably zinc, capable of yielding by electrolysis water-soluble, substantially colorless salts. Because zinc is of relatively low cost as well as because its salts are colorless, it is considered preferable over such other metals as aluminum, tin, platinum, etc., also capable of yielding by electrolysis water-soluble, substantially colorless salts. Each disc 13 may comprise a central hub 13a fixed to the shaft 12, which extends from a position near the tank bottom 14 through the tank top 15, by a nut 16 threaded onto the lower extremity of the shaft and clamping the disc hubs tightly against a shoulder 17a afforded by a sleeve 17 that surrounds the shaft portion passing through the tank top.

The shaft 12 and the discs 13 carried thereby are supported for rotation on the tank top by an annular pedestal 18 to whose internal cylindrical wall 19 are fixed in spaced relationship a pair of outer races 20 for the balls 21 of conventional ball bearings. The inner races 22 of the ball bearings are fixed to the upper end portion of the sleeve 17 which is suitably clamped to the shaft 12. The shaft extends upwardly beyond the upper roller bearing to afford an upper end portion 12a to which is keyed or otherwise suitably secured a multi-grooved pulley capable of being rotated by a multiplicity of belts 24 on a pulley 25 shown secured directly to the shaft of an electric motor 26, which is shown fastened to the external tank wall. The shaft portion immediately above the upper ball bearing 22 carries threaded thereon a nut 27 below which there is a washer 28 bearing on the upper end of the inner race of the upper ball bearing, wherefore, the nut 27 may be tightened down against the washer 28 to draw the disc hubs 13a and the sleeve 17 upwardly into the desired clamped-together or fixed relationship on the shaft 12. The upper end of the pedestal 18 may be largely closed off by a dust guard 29, the pedestal 18 and its dust guard thus constituting in effect a housing for the ball bearings and the neighboring shaft elements and in turn being housed within the hollow interior 23a of the pulley 23.

Stationed within the tank 10 are a plurality of discs 30 which extend in the spaces between the discs 13 and which contain central openings 31 to enable the desired zigzag flow of clay suspension upwardly through the tank in between such stationary discs 30 and the rotary discs 13. As is true of the discs 13, the discs 30 preferably consist of zinc, although other electro-conducting metals yielding colorless salts may be used for such discs. The discs 30 may be fixed in the appropriate spaced relationship on a plurality of rods 31, suitable bushings or sleeves 32 being placed in between such discs so as to hold them in such relationship. The lower end portions of the rods 31 carry threaded thereon clamping nuts 33; and the upper end portions of such rods, which pass through the tank top 15, also carry threaded thereon clamping nuts 34 capable of being tightened down against the tank top to fix the discs 30 within the tank as a unitary structure. It might be noted that the outer edges or margins of the stationary discs 30 preferably fit tightly against the internal tank wall so as to prevent leakage of clay suspension past such edges during the zigzag flow of suspension upwardly between the stationary and rotary discs. The outer edges of the rotary discs 13 suitably clear the rods 31 and the sleeves 32, as appears best in Figure 3. The clay suspension to undergo the blunging and decolorizing actions of the apparatus hereof may be progressively fed into the tank through its bottom 14, as by a valved delivery pipe 35.

The series of rotary discs 13 and the series of stationary discs 30 are impressed during the operation of the apparatus hereof with opposite electric charges; and, while it is possible to impress either series of discs with either a positive or negative direct current E. M. F., yet, as illustrated in Figure 1, the rotary discs 13 may be made the anodes and the stationary discs 30 the cathodes. Accordingly, when the stationary discs 30 are made part of an electric circuit to which direct current is supplied by a direct current generator 36 whose negative pole is wired to a negative terminal 37 contacting with the clamping nut 34, the desired negative electric charge is furnished through the electro-conducting rods 31 to all of the stationary discs 30. The positive pole of the generator 36 may be wired, as through an adjustable resistance or rheostat 38, to a contact member 39 making brushing contact with a ring 40 fixed to the upper end portion of the shaft 12 through whose electro-conductance all of the rotary discs 13 become impressed with a positive electric charge. Short-circuiting between the positively charged discs 13 and the negatively charged cathodes 30 may be prevented by placing suitable electro-insulating material 41 between the tank top 15 and the base of the pedestal 18 and by placing electro-insulating sleeves and washers 42 and 43 in between the tank top 15 and the shanks and lower heads, respectively, of bolts 44 used for fastening the pedestal 18 to the tank top. No electro-insulating material is necessary between the nuts 45 for the bolts 44 and the pedestal flange 18a against which they bear.

The uppermost stationary disc 46 is shown as projecting outwardly beyond the edges of the other stationary discs and as resting on the upper edge of the tank wall 10 so as to define together with the tank top 15 and an annular member or band 55 an upper compartment 47 for receiving the fully blunged and decolorized clay suspension and for directing such suspension out through a spout 48 discharging into a suitable receiver (not shown).

The apparatus hereinbefore described is not only of simple, inexpensive, and compact structure but enables easy renewal of the electrodes 13 and/or 30 after they have been so far consumed in use as to function unsatisfactorily. Thus, when renewal of such electrodes is desired, all that need be done is to disconnect the pulley belts 24 and perhaps also the wires leading to the electrodes, whereupon all of the parts constituting the cathode disc assembly together with all of the parts constituting the anode disc assembly may be bodily raised as a unitary structure from within the tank, as by hoisting tackle hooked into eye members 50 with which the tank top is shown equipped. Once such structure is outside the tank, it is a comparatively easy matter to disassemble therefrom the electrodes and to replace them by new ones.

It has been found that a rather wide range of voltages may be impressed across the positive and negative electrodes of the apparatus hereof with satisfactory results, for instance, voltages as low as about 5 to 30. As will be appreciated by those skilled in the art, the optimum voltage in any particular case will depend upon a wide variety of factors, such as the spacing or distance between the cathodes and the anodes, the concentration of dissolved electrolyte in the clay suspension being treated, etc. In blunging to fine particle size and simultaneously decolorizing clays such as are quarried at or near Dry Branch, Georgia, by the apparatus hereof, it has been found possible to produce eminently satisfactory results by passing crude clay suspension of about 35% solids content and containing about 2 to 10 pounds of liquid sulphur dioxide per ton of solids through the apparatus hereof. The sulphur dioxide may be added to the suspension during the initial coarse blunging treatment or afterwards as liquid sulphur dioxide, or as sulphurous acid solution, or in gaseous form. It will, of course, be appreciated that the sulphur dioxide proportion cited is simply illustrative and that more or less sulphur dioxide might be employed, depending upon the content of coloring impurities associated with the particular clay being treated, the particular apparatus hereof in which the treatment is being effected, etc. Besides sulphurous acid, the coarse clay suspension being delivered to the apparatus hereof may contain a small amount of sulphuric acid, for instance, about ¼ to ½%, based on the solids content of the suspension, as I have found that such small amount of sulphuric acid accelerates the decolorization of the clay, particularly when the clay being treated contains coloring impurities in comparatively large amount in the form of ferric oxide or similar compounds.

A portion of the coarse impurities, such as mica and sand, usually associated with crude clay, tends to settle at the bottom of the apparatus hereof as the coarse clay suspension is being reduced to finer particle size and is simultaneously being decolorized therein. A valved drain pipe 51 is shown leading from the tank bottom 14 so that when the bottom becomes laden with a substantial layer of coarse impurities, such impurities may be washed out by running wash water into the tank either through the delivery pipe 35 or through another delivery pipe (not shown). The decolorized fine particle size clay suspension delivered by the apparatus hereof may be put through after-treatments to which decolorized clay suspensions are usually subjected. Thus, the decolorized clay suspension may be rinsed one or more times with water to wash out substantially completely the colorless water-soluble salts, whereupon residual coarse impurities may be substantially completely removed from the suspension by gravitational settling and/or centrifugal separation. The substantially grit-free decolorized clay suspension may then be treated with alum or other flocculating agent and the flocculated clay recovered from suspension in a filter press, centrifuge, or the like. In some instances, however, the clay may be recovered from suspension by electrophoretic centrifugation, as described in my Patent No. 2,057,156, dated October 13, 1936; or the clay may be recovered from suspension as a series of fractions or grades of different particle size, as by the centrifugal fractionating method described in my application Serial No. 89,886, filed July 10, 1936.

The term "clay" as used in the foregoing description and in the appended claims is meant to include not only clay but other earthy or mineral materials capable of being disrupted to finer particle size and being decolorized in aqueous suspension more or less similarly to clay, for instance, such mineral material as calcium sulphate, barium sulphate, or other water-insoluble fillers or pigments that are precipitated from aqueous solution to form suspensions whose suspended solids are more or less aggregated and carry occlusions of ferric oxide or analogous coloring impurities.

I claim:

1. A method of treating clay carrying colored impurities of the nature of ferric oxide, which comprises treating such clay as an acidic aqueous suspension containing an electrolyte, which is capable of generating nascent reducing agent at a cathode and reducing ferric iron to the ferrous state, between at least one pair of relatively moving electrode surfaces clearing each other by a narrow gap, at least one of which electrode surfaces is a cathode, thereby subjecting the clay particles to hydraulic shearing action while simultaneously exposing the clay particles to the nascent reducing agent being generated at said cathode surface and thus reducing and dissolving as substantially colorless compounds in the aqueous suspending medium the colored impurities carried by said clay.

2. A method of treating clay carrying colored impurities of the nature of ferric oxide, which comprises streaming such clay as an acidic aqueous suspension containing an electrolyte, which is capable of generating nascent reducing agent at a cathode and reducing ferric iron to the ferrous state, between at least one pair of relatively moving cathode and anode surfaces clearing each other by a narrow gap, thereby subjecting said clay particles to hydraulic shearing action while simultaneously exposing the clay particles to the nascent reducing agent being generated at said cathode surface and thus reducing and dissolving as substantially colorless compounds in the aqueous suspending medium the colored impurities carried by said clay.

3. A method of treating clay carrying colored impurities of the nature of ferric oxide, which comprises streaming such clay as an acidic aqueous suspension containing an electrolyte, which is capable of generating nascent reducing agent at a cathode and reducing ferric iron to the ferrous state, between at least one pair of relatively moving electrode surfaces clearing each other by a narrow gap, at least one of which electrode surfaces is a cathode and both of which electrodes are constructed of zinc, thereby subjecting said clay particles to hydraulic shearing action while simultaneously exposing the clay particles to the nascent reducing agent being generated at said cathode surface and thus reducing and dissolving as substantially colorless compounds in the aqueous suspending medium the colored impurities carried by said clay.

4. A method of treating clay carrying colored impurities of the nature of ferric oxide, which comprises treating such clay as an acidic aqueous suspension containing sulphurous acid radical between at least one pair of relatively moving electrode surfaces clearing each other by a narrow gap, at least one of which electrode surfaces is a cathode, thereby subjecting the clay particles to hydraulic shearing action while simultaneously exposing the clay particles to the nascent hyposulphurous acid being generated at said cathode surface and thus reducing and dissolving as substantially colorless salt in the aqueous suspending medium the colored impurities carried by said clay.

5. A method of treating clay carrying colored impurities of the nature of ferric oxide, which comprises streaming such clay as an acidic aqueous suspension containing sulphurous acid radical between at least one pair of relatively moving cathode and anode surfaces clearing each other by a narrow gap, thereby subjecting the clay particles to hydraulic shearing action while simultaneously exposing the clay particles to the nascent hyposulphurous acid being generated at said cathode surface and thus reducing and dissolving as substantially colorless salt in the aqueous supending medium the colored impurities carried by said clay.

6. A method of treating clay carrying colored impurities of the nature of ferric oxide, which comprises streaming such clay as an acidic aqueous suspension containing an electrolyte, which is capable of generating nascent reducing agent at a cathode and reducing ferric iron to the ferrous state, in zigzag flow between a succession of relatively rotating substantially coaxial electrode plates clearing one another by a narrow gap, at least every alternating one of which plates is a cathode plate, thereby subjecting the clay particles to hydraulic shearing action while simultaneously exposing the clay particles to the nascent reducing agent being generated at said cathode plates and thus reducing and dissolving as substantially colorless compounds in the aqueous suspending medium the colored impurities carried by said clay.

7. A method of treating clay carrying colored impurities of the nature of ferric oxide, which comprises streaming such clay as an acidic aqueous suspension containing sulphurous acid radical in zigzag flow between a succession of relatively rotating substantially coaxial electrode plates clearing one another by a narrow gap, at least every alternating one of which plates is a cathode plate, hereby subjecting the clay particles to hydraulic shearing action while simultaneously exposing the clay particles to the nascent hyposulphurous acid being generated at said cathode plates and thus reducing and dissolving as substantially colorless salt in the aqueous suspending medium the colored impurities carried by said clay.

8. An electrolytic cell provided with a succession of substantially coaxial relatively rotatable electrode plates clearing one another by narrow gaps between the faces of said plates, at least some of which succession of plates are cathode plates, means for causing relative rotation between said plates, means for streaming liquid to be electrolyzed through said gaps from one end of said succession of plates to its other end, and means for impressing said cathode plates with a negative E. M. F.

9. An electrolytic cell provided with a succession of substantially coaxial relatively rotatable electrode plates clearing one another by narrow gaps between the faces of said plates, the plates of which succession are alternating cathode and anode plates, means for causing relative rotation between said anode and cathode plates, means for streaming liquid to be electrolyzed through said gaps from one end of said succession of plates to its other end, and means for impressing said anode and cathode plates with a positive and negative E. M. F., respectively.

10. An electrolytic cell provided with a succession of substantially coaxial relatively rotatable electrode plates arranged in substantially horizontal planes and clearing one another by narrow gaps between the faces of said plates, at least every alternating one of which plates is a cathode plate, means for causing relative rotation between said plates, means for introducing liquid to be electrolyzed into the cell near its bottom, means for withdrawing electrolyzed liquid from the cell near its top, said plates defining a zigzag path of flow for said liquid introduced near the bottom of the cell to the top of the cell and said path of flow including in part the gaps between said plates, and means for impressing said cathode plates with a negative E. M. F.

11. An electrolytic cell provided with a succession of substantially coaxial relatively rotatable electrode plates arranged in substantially horizontal planes and clearing one another by narrow gaps between the faces of said plates, the plates of which succession are alternating cathode and anode plates, means for causing relative rotation between said plates, means for introducing liquid to be electrolyzed into the cell near its bottom, means for withdrawing electrolyzed liquid from the cell near its top, said plates defining a zigzag path of flow for said liquid introduced near the bottom of the cell to the top of the cell and said path of flow including in part the gaps between said plates, and means for impressing said anode and cathode plates with a positive and negative E. M. F., respectively.

12. An electrolytic cell whose interior is defined by a cylindrical wall and which contains a succession of substantially coaxial relatively rotatable discs arranged in substantially horizontal planes and including a series of rotary anode discs and a series of stationary cathode discs alternating with the series of anode discs, all of said discs clearing one another by narrow gaps between the faces of said discs, a common shaft to which said rotary discs are fixed, means for rotating said shaft, said series of stationary cathode discs being centrally perforated and their circumferential edges substantially abutting the interior of said cylindrical wall, whereby said two series of discs define a zigzag path of flow for liquid to be electrolyzed from the bottom of said cell to the top of said cell and said path of flow including in part the gaps between said discs, means for introducing the liquid to be electrolyzed near the bottom of the cell, means for withdrawing electrolyzed liquid near the top of the cell, and means for impressing said anode and cathode discs with a positive and negative E. M. F., respectively.

SANFORD C. LYONS.